(12) United States Patent
Blevins

(10) Patent No.: US 10,298,104 B2
(45) Date of Patent: May 21, 2019

(54) ELECTRICAL MOTOR AND ELECTRICAL GENERATOR DEVICE

(71) Applicant: Power IT Perfect, Inc., Charlotte, NC (US)

(72) Inventor: Larry James Blevins, North Wilkesboro, NC (US)

(*) Notice: Subject to any disclaimer, the term of this patent is extended or adjusted under 35 U.S.C. 154(b) by 285 days.

(21) Appl. No.: 14/448,445

(22) Filed: Jul. 31, 2014

(65) Prior Publication Data

US 2015/0303782 A1 Oct. 22, 2015

Related U.S. Application Data

(60) Provisional application No. 61/980,182, filed on Apr. 16, 2014.

(51) Int. Cl.
| | |
|---|---|
| *H02K 21/00* | (2006.01) |
| *H02K 21/24* | (2006.01) |
| *H02K 5/22* | (2006.01) |
| *H02K 16/00* | (2006.01) |
| *H02K 11/215* | (2016.01) |
| *H02K 11/33* | (2016.01) |
| *H02K 7/08* | (2006.01) |

(52) U.S. Cl.
CPC ............ *H02K 21/24* (2013.01); *H02K 5/225* (2013.01); *H02K 11/215* (2016.01); *H02K 11/33* (2016.01); *H02K 16/00* (2013.01); *H02K 7/08* (2013.01)

(58) Field of Classification Search
CPC ...... H02K 11/215; H02K 11/33; H02K 5/225; H02K 16/00; H02K 7/08; H02K 21/24; H02K 19/34; H02K 19/36; H02P 3/22

USPC .......... 310/112, 113, 114, 115, 67 A, 49.22, 310/49.23, 49.29, 49.34, 102 R, 107, 266, 310/268
See application file for complete search history.

(56) References Cited

U.S. PATENT DOCUMENTS

| | | | |
|---|---|---|---|
| 4,782,259 A | 11/1988 | Shikama et al. | |
| 5,021,698 A * | 6/1991 | Pullen | H02K 1/2793 310/112 |
| 5,721,461 A | 2/1998 | Taylor | |
| 5,806,169 A | 9/1998 | Trago et al. | |
| 5,912,522 A * | 6/1999 | Rivera | H02K 3/28 310/156.12 |
| 5,982,074 A * | 11/1999 | Smith | H02K 3/04 310/156.36 |

(Continued)

OTHER PUBLICATIONS

International Search Report for International Application No. PCT/US2015/026090 dated Jul. 10, 2015.

*Primary Examiner* — Bernard Rojas
*Assistant Examiner* — Maged M Almawri
(74) *Attorney, Agent, or Firm* — Smith Anderson, LLP

(57) ABSTRACT

The present invention provides methods and systems for an electrical motor or power generator device that includes a housing having a front end cap and a rear end cap, and a shaft rotationally engaged to the front end cap and rear end cap. The device includes at least one in-line stator including an external ring disposed around a centrally located bore for receiving the shaft, and at least one opening within the external ring for receiving a coil assembly. The device further includes at least one in-line rotor that includes a plate with a centrally located bore for receiving the shaft, and at least one opening within the plate for receiving a magnet assembly.

25 Claims, 12 Drawing Sheets

(56) References Cited

U.S. PATENT DOCUMENTS

| | | | |
|---|---|---|---|
| 6,483,219 B2* | 11/2002 | Nikolic | H02K 31/00 310/178 |
| 6,737,782 B2 | 5/2004 | Suzuki et al. | |
| 7,714,468 B2 | 5/2010 | Hashiba et al. | |
| 7,777,391 B2* | 8/2010 | Asano | H02K 1/148 310/156.57 |
| 7,973,443 B2* | 7/2011 | Nakamasu | H02K 1/2793 310/156.62 |
| 8,614,529 B2* | 12/2013 | Ritchey | H02K 7/108 310/114 |
| 9,800,111 B2* | 10/2017 | Palmer | H02K 3/47 |
| 9,812,981 B2* | 11/2017 | Ritchey | H02P 25/18 |
| 2005/0127769 A1* | 6/2005 | Minagawa | H02K 1/2793 310/156.32 |
| 2006/0131986 A1* | 6/2006 | Hsu | H02K 21/24 310/268 |
| 2006/0284507 A1* | 12/2006 | Murakami | H02K 1/2793 310/156.37 |
| 2008/0088200 A1* | 4/2008 | Ritchey | H02K 16/00 310/268 |
| 2009/0302808 A1* | 12/2009 | Patel | H02K 53/00 322/4 |
| 2010/0219707 A1* | 9/2010 | Nadeau | H02K 21/24 310/112 |
| 2010/0253085 A1* | 10/2010 | Minowa | H02K 21/24 |
| 2011/0095628 A1* | 4/2011 | Enomoto | H02K 1/148 310/44 |
| 2011/0121576 A1* | 5/2011 | Bayko | F03D 3/005 290/55 |
| 2012/0104880 A1* | 5/2012 | Takemoto | H02K 1/2793 310/44 |
| 2012/0133231 A1* | 5/2012 | Hayakawa | H02K 16/00 310/156.37 |
| 2012/0229060 A1* | 9/2012 | Ritchey | H02P 25/18 318/400.3 |

* cited by examiner

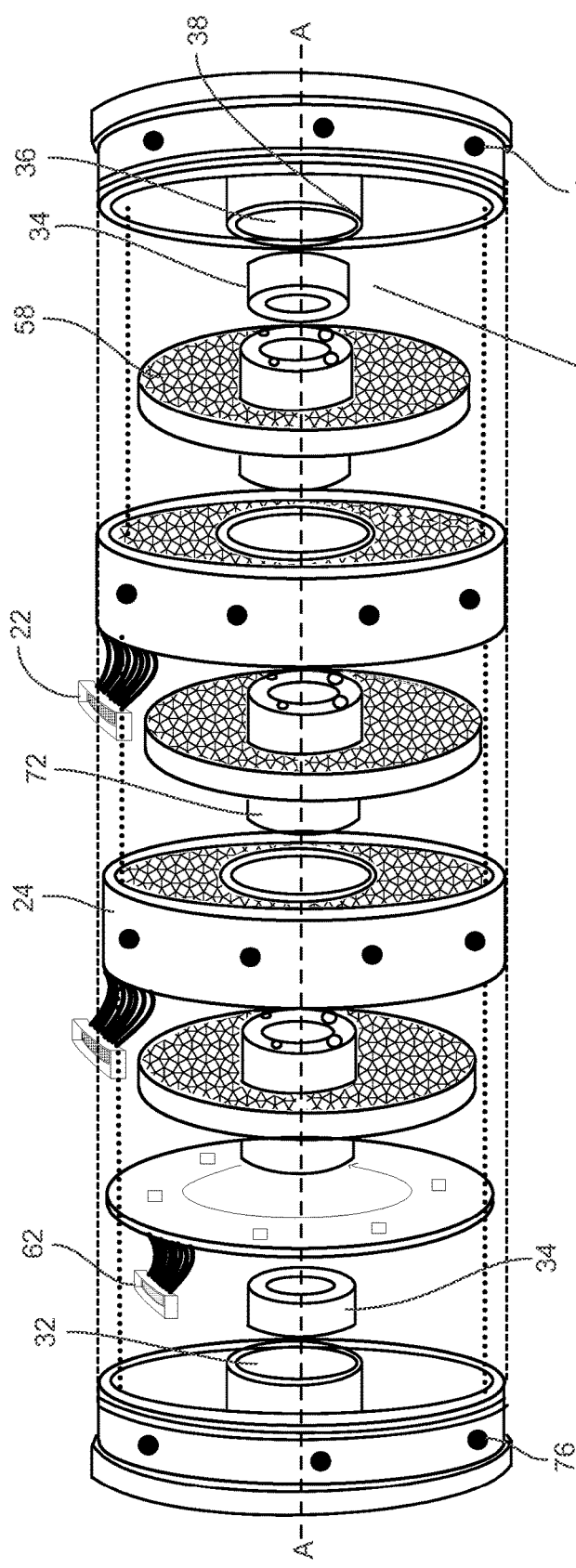
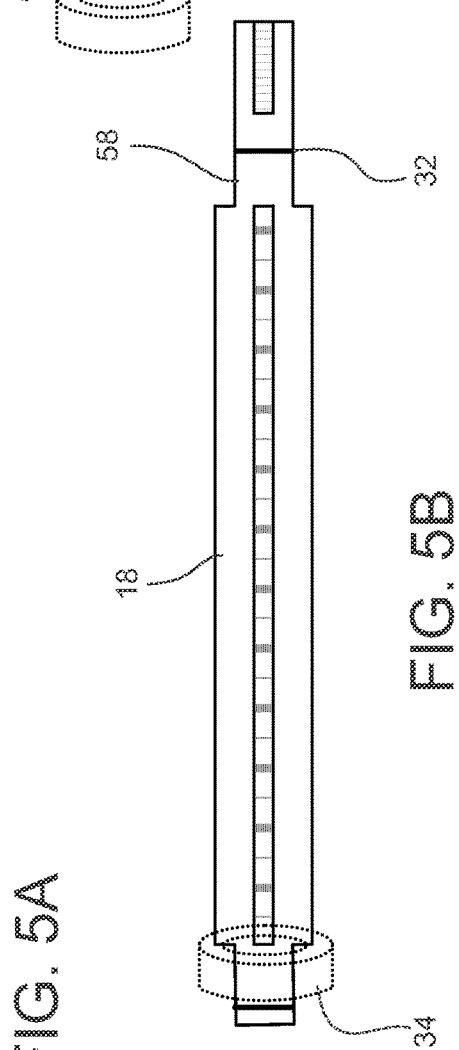
FIG. 5A
FIG. 5B

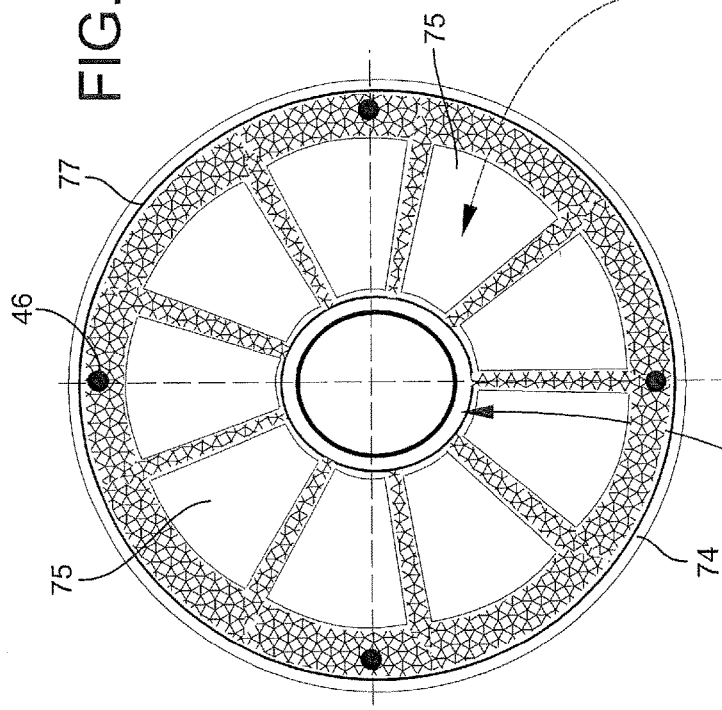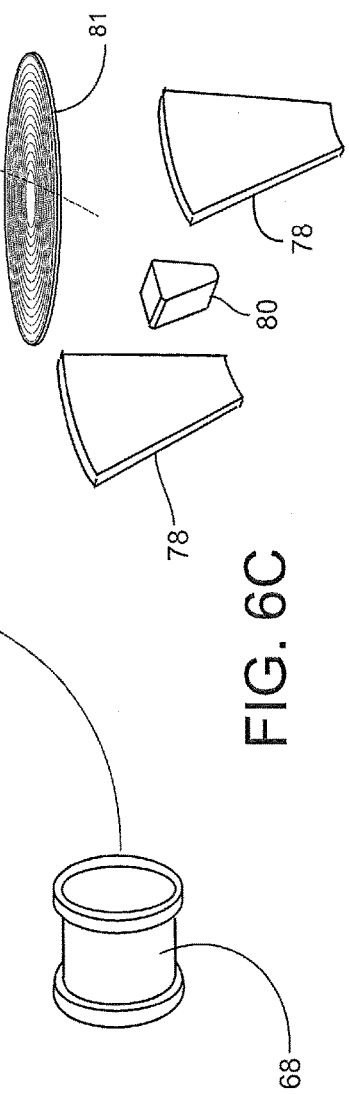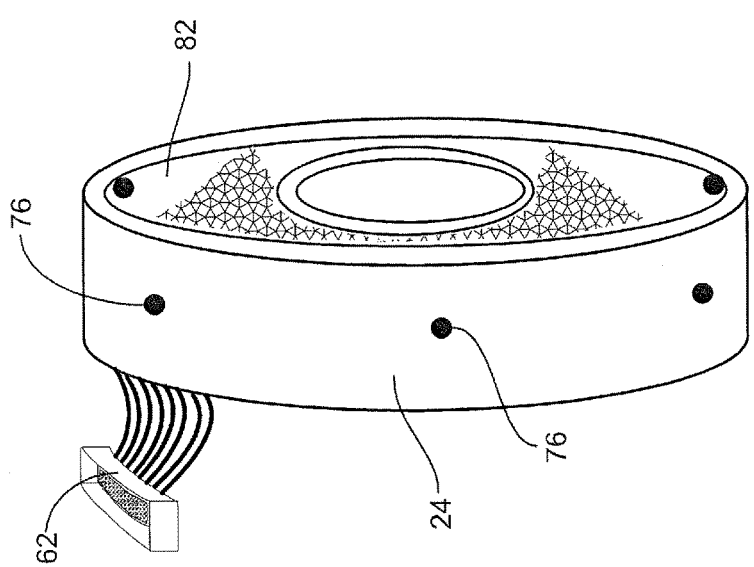

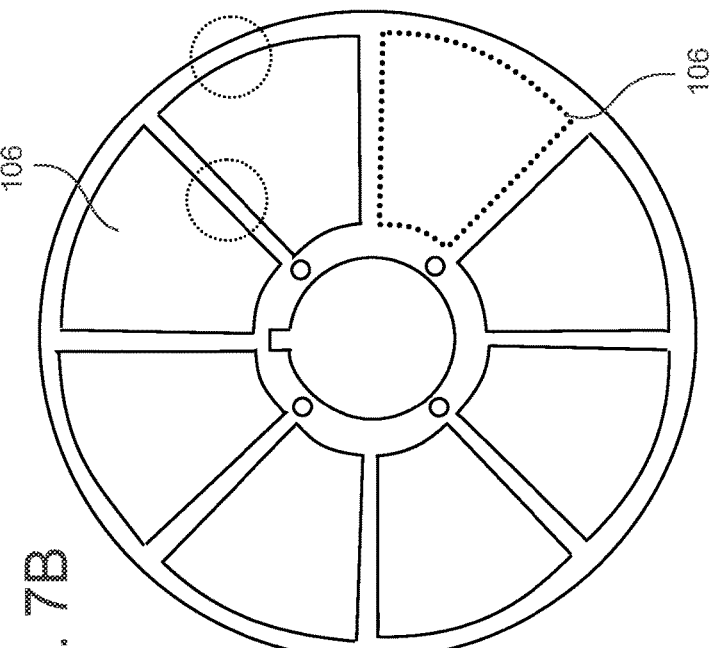
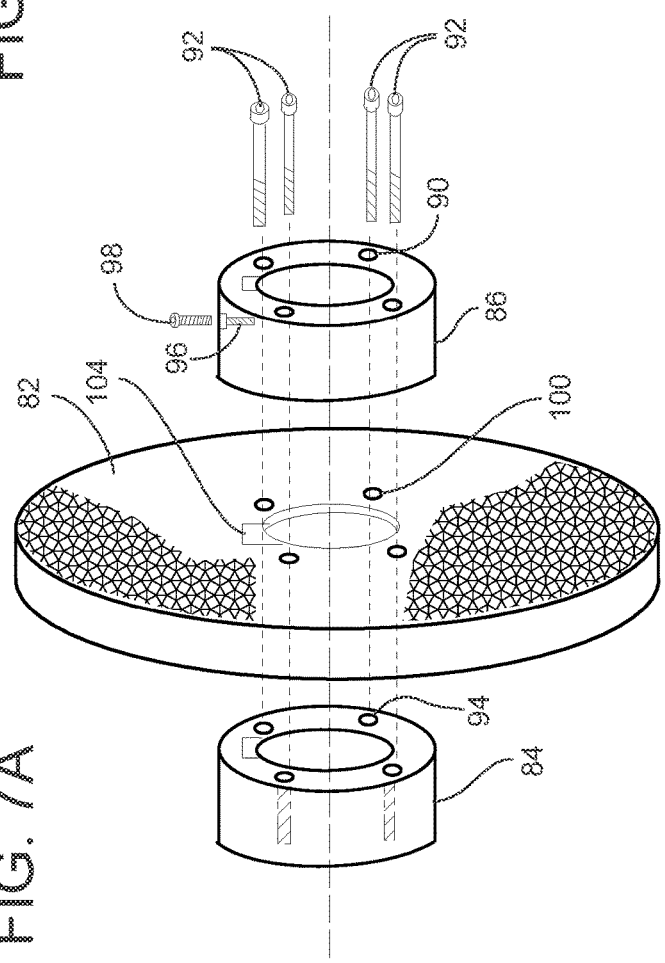
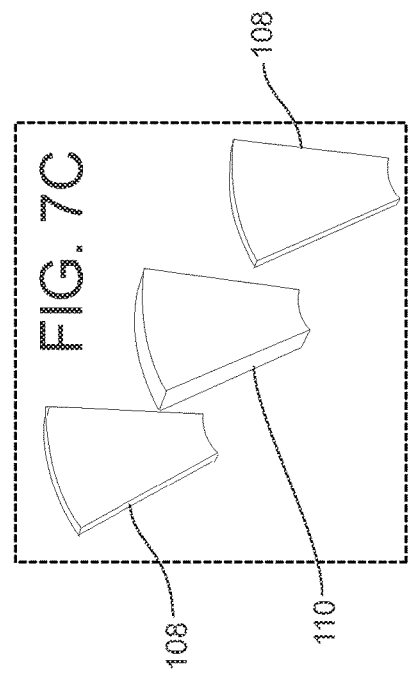

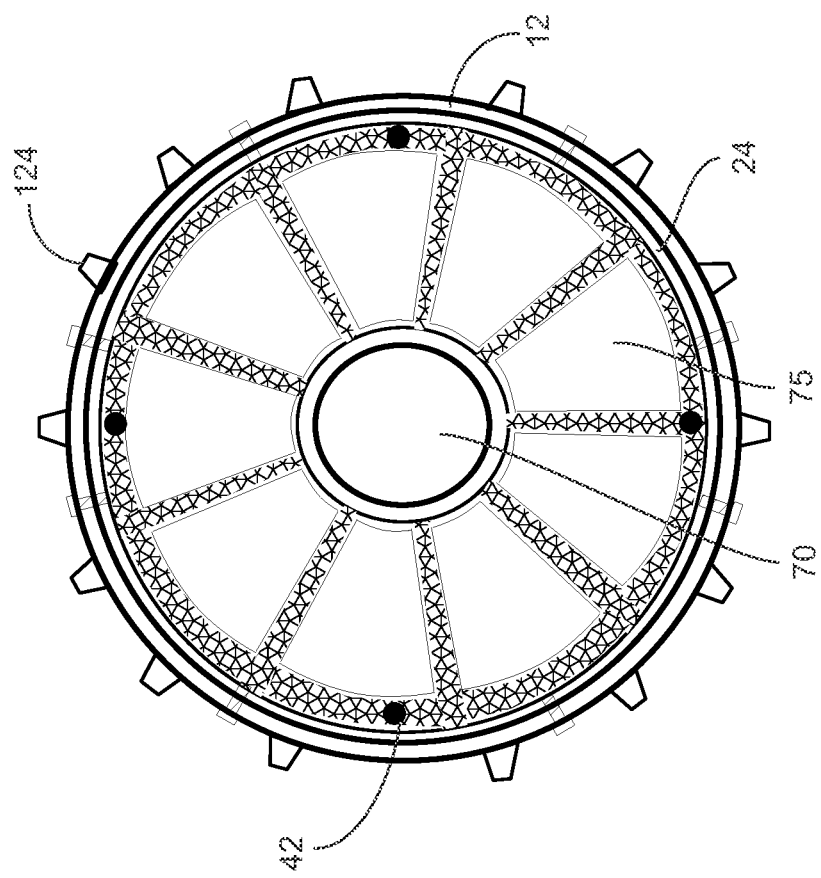
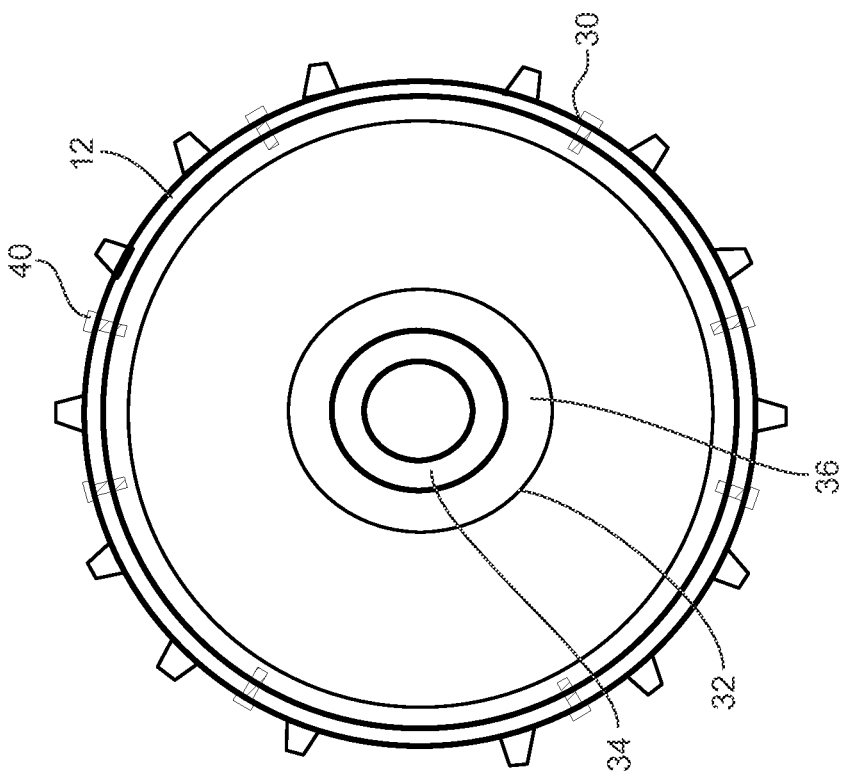
FIG. 8B
FIG. 8A

ELECTRICAL MOTOR AND ELECTRICAL GENERATOR DEVICE

CROSS REFERENCE TO RELATED PATENT APPLICATION

The current application claims the benefit of the earlier priority filing date of provisional application Ser. No. 61/980,182 that was filed on Apr. 16, 2014.

FIELD OF THE INVENTION

The present invention relates generally to an electrical motor and electrical power generation device, and more particularly relates to an electrical motor and electrical power generation device with increased efficiency and productivity.

BACKGROUND OF THE INVENTION

The present invention is directed to an electric motor or electric generator that efficiently stores electric energy and also the effectively accumulates kinetic energy, such as that produced by wind, water, or man-made physical mass. The present invention allows each individual coil or winding (or group thereof) of the electric motor or electrical generator to be treated as an individual entity which allows for instant switching between power regeneration or mechanical power production. This invention complies with new electric grid demands such as 'time of use rates' with the ability to operate efficiently as a mechanical device from stored electrical energy, allowing the invention to operate off grid for extended periods of time.

Current energy shortfalls demand a method to equalize demands between peak usage times and off peak production. Since most electric producers have no ability to efficiently store this electrical energy, an efficient platform for the consumer is needed that is solved by the present invention. The electrical motor and electrical generator disclosed herein assists in electrical power equalization or distribution, making electric energy more profitable for the producer as well as more affordable for the consumer with waste being eliminated from the profit and loss bottom line.

BRIEF SUMMARY OF THE INVENTION

The current invention embodies the dual function of mechanical power production and the ability to produce and collect electrical power simultaneously. By embodying each coil/winding as a separate entity or separate group, each then has the ability to be monitored and controlled by a preprogrammed motor controller module, (PLC) or software enabling this invention to be controlled from the typical computer. Each coil/winding or group thereof then can managed and commanded to either collect electrical power or to produce mechanical power through improved repulsion and or attraction of the magnet assemblies disposed at the perimeter of the multiple vertical rotors and stator assemblies. The ability to manage each coil or winding dictates a wide range of available mechanical power as well as a wide range of collectable electric power giving the unique property and ability to recharge and or replenish the power source when operating at levels of demand less than full power.

The control module being critical for efficient operation under varying load demands requires a high speed PC, PLC or micro processor to manage input and output signals and to switch between required duties. Input signals are derived from Hall Effect or optical sensors disposed internally or an equivalent form of a rotary encoder which may be physically attached to an extended tail shaft. These input signals are designed to work in conjunction with a wide array of outside sensors including but not limited to speed sensors, RPM sensors, grade ascension and dissention sensors. This invention requires, in its complete design, a PC or PLC capable of managing multiple directions switches that direct current flow between mechanical power production and electrical power production. Varying degrees of complexity for the motor control design is dependent upon the required duties of the motor/generators intended purpose. For more complex control a preprogrammed series of algorithms are written in software form, installed into and executed by the PLC or PC. Differing from the typical electric motor in which pulse width modulation is used to control speed and load, pulse width modulation is primarily used to soften the initial startup of the motor/generator after which the PC or PLC uses switching between mechanical and electrical power production thereafter to manage the load requirements as demanded.

This current invention differs from the typical electric motor in which the stator windings and the rotor are designed to be parallel with the motor shaft and affixed to the housing. In this invention the rotors (multiple) and stators assemblies are disposed at a ninety degree dimension from the motor shaft and housing. This vertical circumference of the rotor and its disposed magnet assemblies along with the stator assemblies create a greater surface tension area which enhances its overall power density footprint. This design allows for all magnetic flux to be directed in a manor where it is always compressed which eliminates flux leakage to the perimeter. The circumference dimension of the rotor and stator and all disposed parts can easily be engineered to be manufactured with varying widths and with larger or smaller circumference dimensions which lends to its versatility of design for specific duties. These vertical rotor and stators form a type of flywheel design not found in the typical electric motor. This design of rotor being machined from quality ferrous material allows for additional strength in regards centrifugal forces of the disposed magnet assemblies and its retention by adding material to the perimeter edge of the rotor. This additional material, adding overall strength to the rotor perimeter, allows for safe high revolutions per minute without the disturbance of the air gap between the rotors, its disposed magnet assemblies and stator coil assemblies. This reengineered rotor and stator design in essence creates increased critical usable surface areas being on the right vertical face and left vertical face (sides) of the multiple rotors which is then utilized in addition to the array of coils/windings in the stator assembly. This array of coils/windings of the stator assemblies operates in the field and proximity of the magnetic flux from the opposing ends of the magnet assemblies disposed in the rotors. All coils and or windings or groups thereof have the ability in conjunction with the control module or motor controller to produce repulsion and or attraction creating mechanical power while retaining the ability and upon demand harvest or collect electrical power. This ability to control each coil/winding or group electronically in essence means that a coil/winding or group thereof can be demanded to produce two or more functions within a single rotation or within determined degrees of rotation of the rotor establishing a new level of efficiency.

BRIEF DESCRIPTION OF THE DRAWINGS

The present invention is illustrated and described herein with reference to the various drawings, in which like reference numbers denote like method steps and/or system components, respectively, and in which:

FIG. 5A is an exploded view of the present invention without the housing.

FIG. 5B is a perspective view of the shaft of the present invention.

FIG. 6A perspective view of an assembled stator assembly.

FIG. 6B is a front view of the stator assembly.

FIG. 6C is an exploded view of the magnet assembly.

FIG. 7A is an exploded view of the rotor assembly.

FIG. 7B is a front view of the rotor assembly.

FIG. 7C is a perspective view of a magnet assembly.

FIG. 8A is a sectional view detailing a singular mounting method of the housing to the motor/generator end caps.

FIG. 8B is a sectional view detailing a singular mounting method of the housing to the motor/generator stator assembly.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
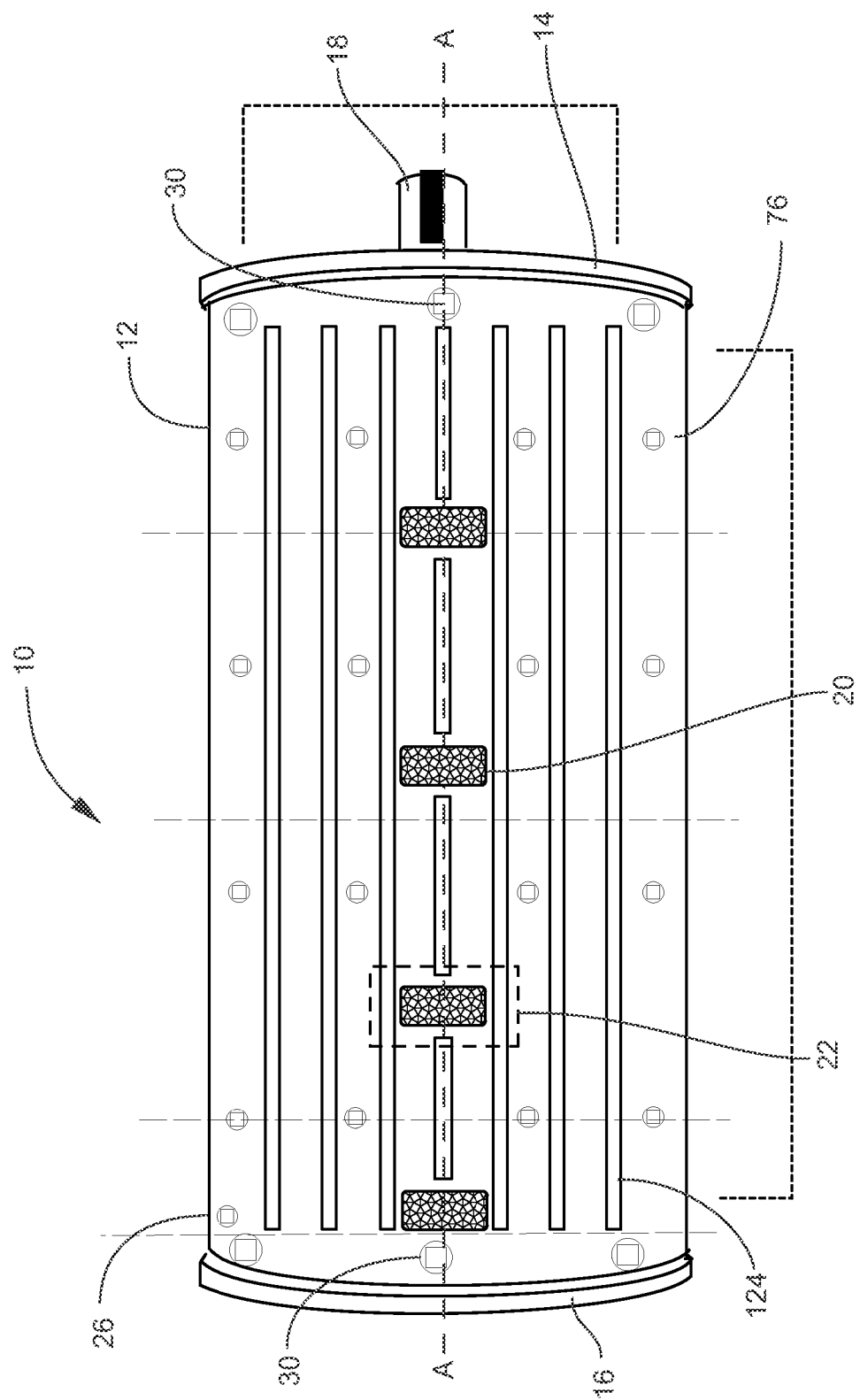
FIG. 1 is a perspective view of the present invention.

Referring now specifically to the drawings, an improved electrical motor or electrical generator device is illustrated in FIG. 1 and is shown generally at reference numeral 10. The device 10 comprises a housing 12, a front end cap 14, a rear end cap 16, and a shaft 18 rotationally engaged to the front end cap 14 and rear end cap 16. The housing 12 has a front end, rear end, interior surface, and exterior surface. The front end cap 14 and rear end cap 16 have an interior side and exterior side. The shaft 18 has a first end and a second end. The first end of the shaft 18 is rotationally engaged to the interior side of the rear end cap 16, and the second end of the shaft 18 protrudes through the front end cap 14 from the interior side to the exterior side.

The housing 12 of the device 10 may be a finely machined metallic structure of preferably a cylindrical design that allows the device 10 to withstand the centrifugal and torsion forces exerted by the internal components of the device 10. Stator openings 20 are disposed on the housing 12 and extend from the exterior side to the interior side of the housing 12. Stator assembly electrical connectors 22 are positioned within the stator openings 20 and may be configured to fit between the stator assembly 24 disposed within the housing 12. A sensor opening is disposed on the housing 12 and extends from the exterior side to the interior side for engaging a Hall Effect sensor plate 28 to the housing 12. A plurality of bores 30 are disposed in close proximity to the front end and rear end of the housing 12 for assisting with the engagement of the front end cap 14 and rear end cap 16 to the housing 12. A corresponding bore 30 is disposed on the front end cap 14 and rear end cap 16, whereby the bore 30 on the housing 12 sits overtop the bore 30 of the respective end cap 14, 16 for receiving an attachment means 40. A plurality of bores 32 are spaced along the housing 12 for assisting with engaging the stator assembly 24 to the housing 12.

Figure 2:
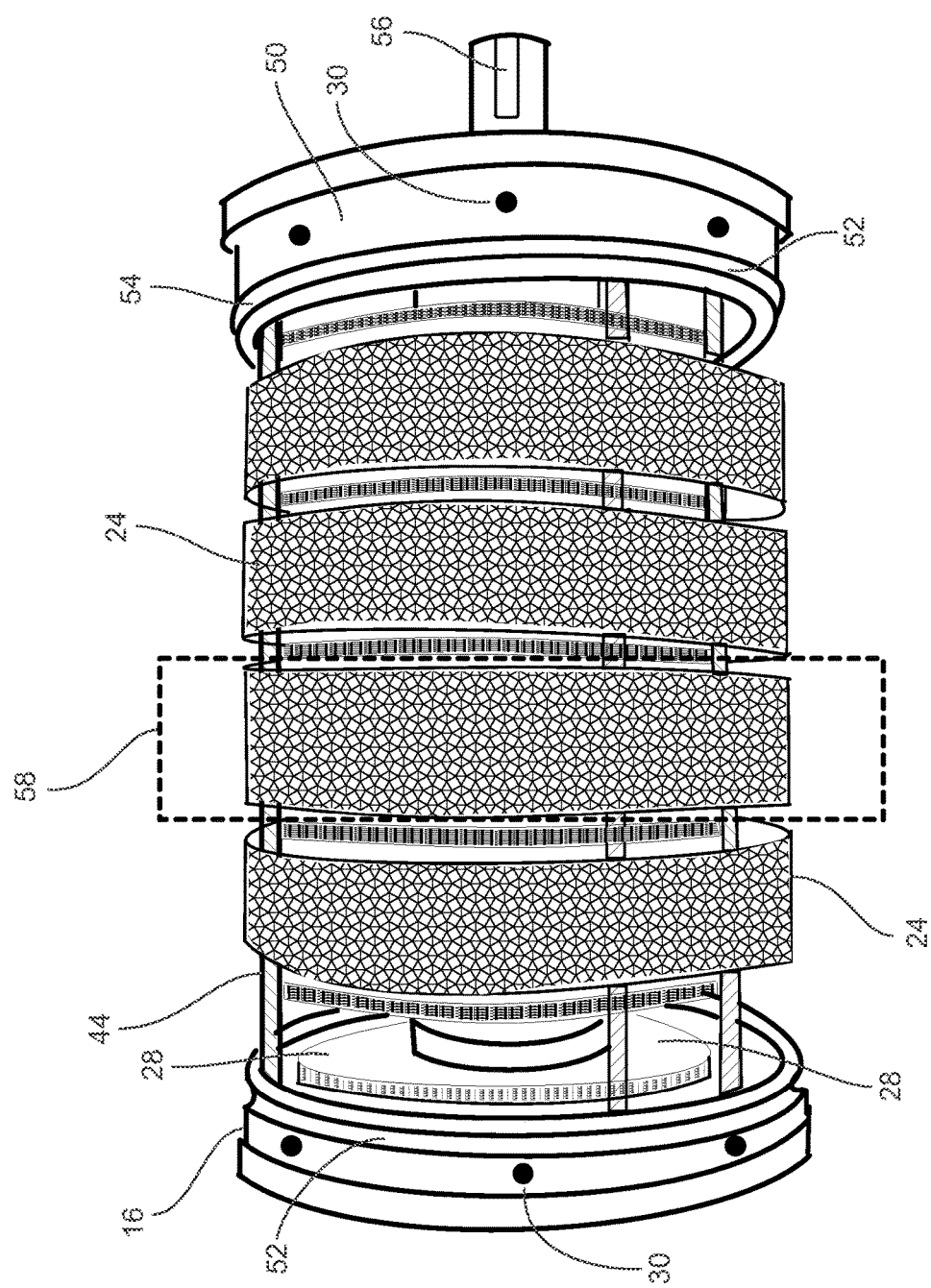
FIG. 2 is a perspective view of the present invention with the housing and electrical connections removed.

As illustrated in FIGS. 2 and 8A, the front end cap 14 and rear end cap 16 is preferably machined from metallic material capable of withstanding the device's 10 generated torsion and torque forces. The rear end cap 16 contains a seat 32 for receiving a main bearing 34 and bearing seal 36. The seat 32 of the rear end cap 16 is positioned on the center of the interior side, or alternatively in close proximity to the center portion of the interior side of the rear end cap 16. The front end cap 14 contains a front end cap bore 38 that extends from the interior side to the exterior side and allows the shaft 18 to extend through the front end cap 14, as shown in FIG. 5. The front end cap bore 38 receives a main bearing 34 and main bearing seal 36, allowing the shaft 18 to be in rotational arrangement with the front end cap 14.

Figure 3:
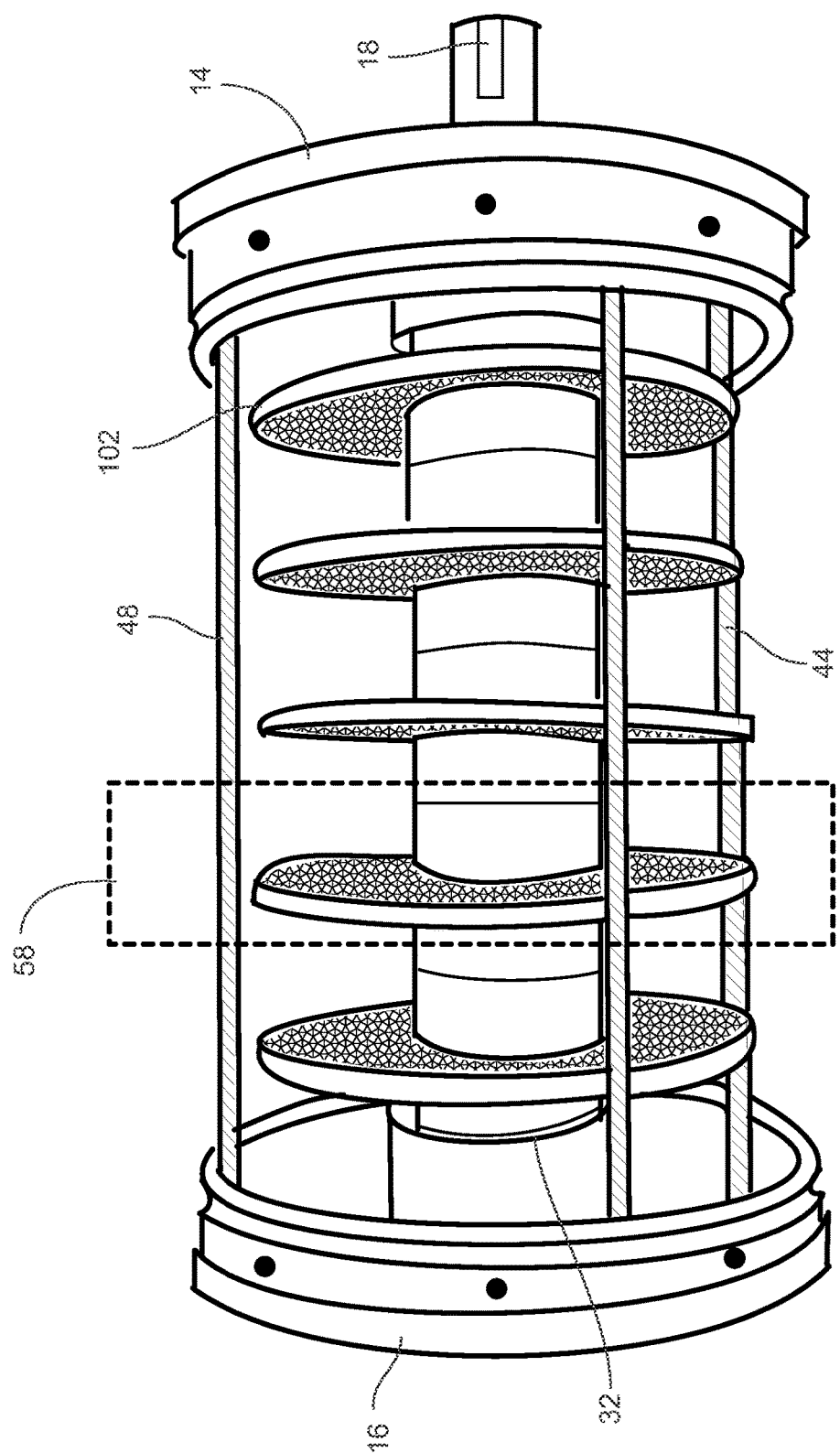
FIG. 3 is a perspective side view of the present invention with the housing, electrical connections and stator assemblies removed showing the disposed rotor parts.
Figure 4:
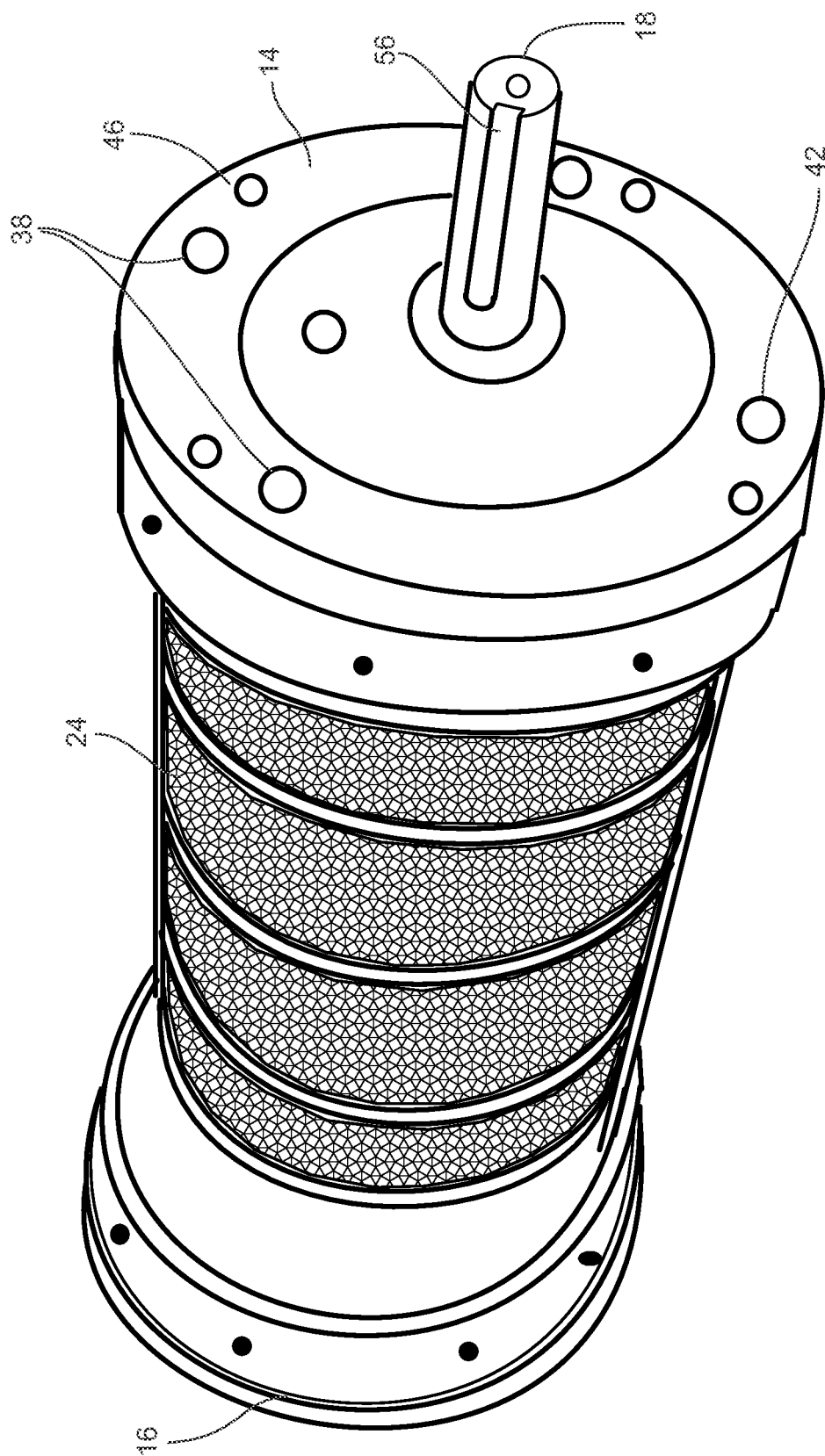
FIG. 4 is a perspective view of the present invention with the housing, electrical connections and stator assemblies removed to expose the assembled disposed rotor parts and face of end cap.

At least one threaded opening 42 is disposed on the interior side of the front end cap 14 and the exterior side of the rear end cap 16, as illustrated in FIGS. 4 and 8B. A correspondingly threaded rod 44, as shown in FIG. 3, having a first end and a second end, is received within and selectively secured to the threaded openings 42. The first end of the threaded rod 44 is received and selectively secured to the threaded opening 42 disposed on the interior side of the rear end cap 16. The second end of the threaded rod 44 is received and selectively secured to the threaded opening 42 disposed on the interior side of the front end cap 14. The end caps 14, 16 additionally may contain threaded bores 46 for receiving correspondingly threaded compression rods 48, having a first end and a second end. These threaded compression rods 48 are multi-functional by serving to compress the end caps 14, 16 tightly to the housing 12, and also to serve to position the stator assemblies 24 sensor plate assembly 28. The first end of the threaded compression rod 48 is received within and selectively secured to the threaded bore 46 on the interior side of the rear end cap 16. The second end of the threaded compression rod 48 is received within and selectively secured to the threaded bore 46 on the interior side of the front end cap 14.

The front end cap 14 and rear end cap 16 contain an annular side 50 with a distal end and a proximal end. An annular channel 52 is disposed on the distal end of the annular side 50 of the front end cap 14 and rear end cap 16, as shown in FIG. 2. Seals manufactured from flexible rubber, such as an o-ring 54 or the like, are positioned within the annular channel 52. The shaft 18 may include a keyway 56 on the second end. In another embodiment, the second end may contain a splined end.

As illustrated in FIG. 3, the device 10 includes at least one rotor 58. A five (5) rotor 58 design is shown with each rotor 58 disposed in a spaced-apart relationship along the length of the shaft 18 of the device. A notch 60 may be formed within the shaft 18 for receiving the center portion of the rotor 58 and retaining the rotor 58 on the shaft 18. The rotor 58 is positioned on the shaft 18 and between the front end cap 14 and rear end cap 16. The compression rod 48 spans between the front end cap 14 and rear end cap 16 spaced-apart from the rotor 58 and providing enough clearance that the compression rod 48 does not contact the rotor 58.

The second end of the shaft 18 may contain a keyway 56, as shown in FIGS. 1-4. The keyway 56 is a channel formed within the second end of the shaft 18 that begins at a point on the external surface of the shaft 18 and extends to the end of the shaft 18. The depth, width, and length of the keyway 56 may have varying dimensions bases upon the uses of the user. As shown in FIGS. 1, 4, and 8A, a plurality of bores 30 are disposed in close proximity to the front end and rear end of the housing 12 for assisting with the engagement of the front end cap 14 and rear end cap 16 to the housing 12. A corresponding bore 30 is disposed on the front end cap 14 and rear end cap 16, whereby the bore 30 on the housing 12 sits overtop the bore 30 of the respective end cap 14, 16 for receiving an attachment means 40. As illustrated in FIG. 8A, the attachment means 40 is a bolt, but the attachment means 40 may also be a screw, fastener, or the like.

FIG. 4 shows a front facial view of the front end cap 14 with indications of machined threaded openings 38 into the front end caps 14. Identical machined threaded opening 38 are disposed on the rear end cap 16. These machined openings 38 serve as a fastening method to assist in end cap 14, 16 removal for maintenance and for assembly of the device 10.

FIG. 5A is an exploded view of a two stator/three rotor design of the device 10. Preferably the shaft 18, which center line is illustrated as A-A, may be constructed and machined from a non-ferrous stainless steel material for the purpose of isolating the magnetic flux to area of the rotor 58. Larger designs and applications may require a machined spline design capable of handling the torsion and centrifugal forces applied. The rotors 58 are disposed upon the shaft 18 and secured in place with the main bearings 34 and 'C' type retaining ring 64. The stators 24 are disposed and secured in the correct horizontal location by locking nuts 66 that fit securely on the threaded compression rods 48. The stator electrical connecters 22 are disposed into the stator openings 20 prepared in the housing 12. As illustrated in FIG. 5B, the bearing seat 32 is depicted which uses a disposed 'C' type retaining ring to lock the bearing 34 into a stationary location on the shaft 18.

The main bearings 34 are disposed into machined seat 32 of both the front end cap 14 and rear end cap 16 and are of a type which will maintain stability through the axial and rotation forces exhorted and are a sealed pre-lubricated type. Bearing speed/RPM rating is dependent upon motor demand and application design but is deemed critical to the motor/generator operation and durability. The seat 32, main bearing 34, and main bearing seal 36 of the front end cap 14 are illustrated in FIG. 8A.

Figure 9:
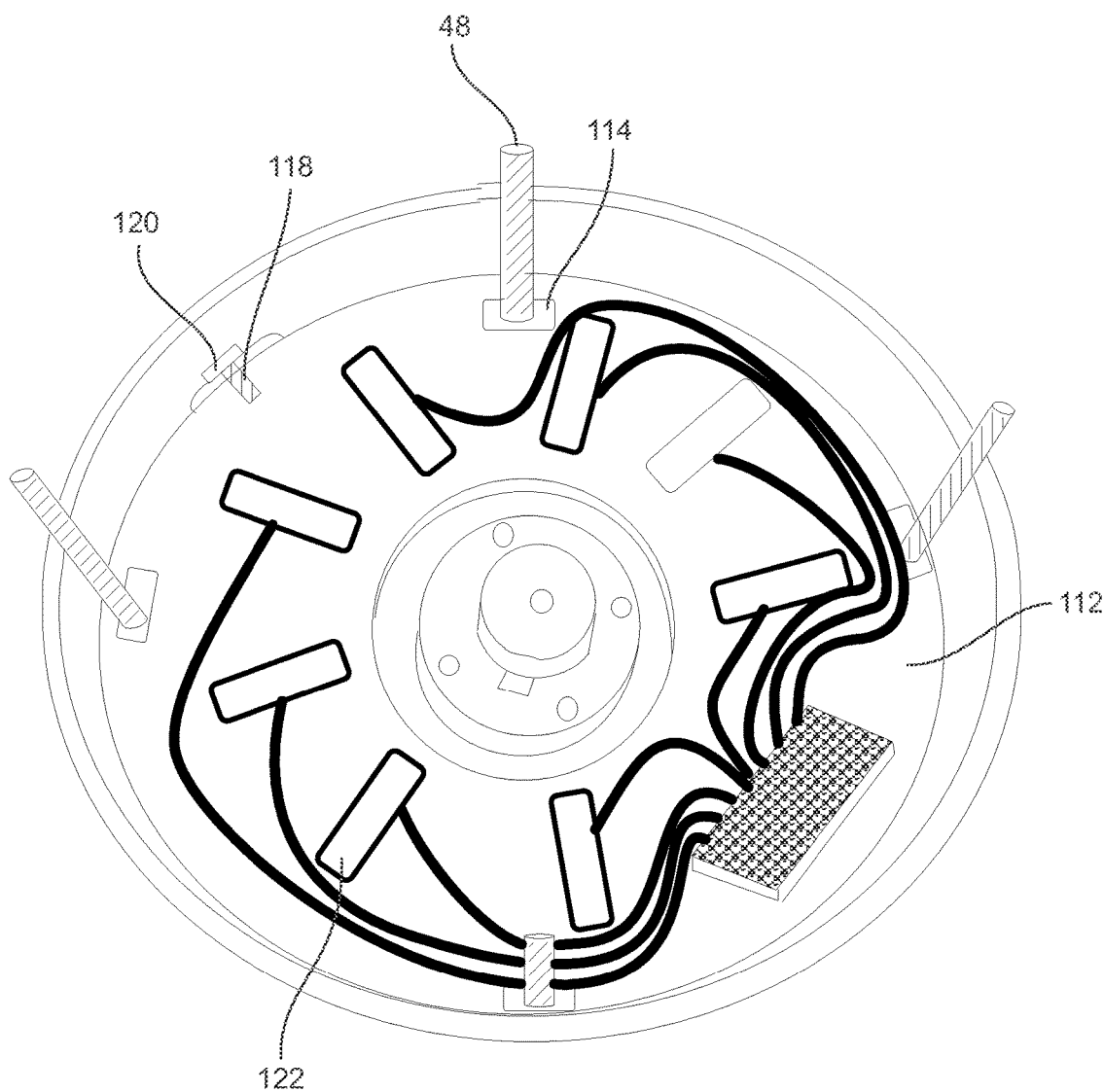
FIG. 9 is a perspective view of a Hall Effect sensor assembly.

FIG. 9 illustrates the Hall Effect sensor assembly 28 disposed and secured in a horizontal location by locking nuts that fit securely on the threaded compression rods 48. An electrical connecting device 62 fits securely into a machined opening into the rear end cap 16. The rotor 58 is disposed upon the shaft 18 and secured in place in conjunction with the bearings and 'C' type retaining ring in that this disposed assembly acts as a singular mechanical device. Further references to the rotor assembly are depicted in FIG. 07 with details depicted in FIG. 07A and FIG. 07B. Stator 24 are disposed and secured in the correct horizontal location by locking nuts that fit securely on the threaded compression rods 48.

A stator 24 is illustrated in FIG. 6A and the face of the stator 24 is illustrated in FIG. 6B. A center hub 68 is disposed with a centrally located opening 70 of the stator 24. The hub 68 may be finely machined from non-ferrous material being aluminum or stainless steel for the purpose of magnetic flux isolation. The hub 68 is hollow and generally circular with an externally, central recessed portion and a raised rim on either side of the hub 68. The raised rim on either side of the hub 68 assist with positioning and retaining the stator 24 on the hub. The central recessed portion of the hub 68 serves as a structural connection when fully assembled with the centrally located opening 70 of the stator 24 for allowing rotor 58 hubs 72 to be received within the centrally located opening 70 of the stator 24. A bearing may be disposed on the central recessed portion of the hub 68. An outer control ring 74 of the stator 24 preferably is finely machined from aluminum in a generally circular design with retention openings 76 being prepared tapped and threaded openings to accept attachment means for securing the stator 24 to the housing 12. Corresponding threaded retention openings 76 are disposed on the housing 12 and extend from the external surface to the internal surface and are positioned over top of the retention openings 76 of the outer control ring 74. This control ring 74 is to set the outside perimeter of the stator 24 but also serves as a heat conductor to dissipate heat generated within the coil assembly of the stator 24 through the housing 12.

An individual coil assembly is depicted in FIG. 6C and having outer magnetic plates 78, and a center magnetic structure 80 on which the coil wiring 81 is positioned around. The coil wiring 81 may be dual or compound wound. The outer magnetic plates 78 and center magnetic structure 80 are preferably finely machined and fit within a form and secured by a specialized welding process after which these combined parts are then coated with an appropriate non electrical conductive coating after which the wire winding process can be completed. The outer magnetic plates 78 and center magnetic structure 80 are preferably precision machined from a low carbon steel requiring a dry hydrogen annealing process to obtain the desired permeability rating of 8000 or more. Laminated 'silicon a' steel is an acceptable alternative but levels of performance will diminish to varying degrees depending on the rotor/generator's application and primary function. The outer control ring 74, hub 68, outer magnetic plates 78, and center magnetic structure 80 are preferably all machined and assembled parts fitted into machined injection mold, held securely in place and all interior electrical connections made to the external electrical connector 22. The threaded bores 46 for receiving the threaded rod 44 and an epoxy 77 may be completed with a carbon fiber exterior covering 82, as shown on FIG. 6A, for additional strength. The epoxy used must have a high thermal conductive rating to disperse heat to the outer control ring 74 and thus to the housing 12 as well as a high structural strength rating.

The stator 24 contains at least one, and preferably a plurality of stator openings 75 for receiving the coil assembly consisting of the coil wiring 81 wound around the outer magnetic plates 78 and center magnetic structure 80. Preferably, the coil wiring 81 is made of copper and the magnetic plates 78,80 are composed of a high permeability steel, such as that sold under the trade name Vim Var™ from ED Fagan, Inc. The stator openings 75 are generally pie shaped, meaning the first side adjacent the outer control ring 74 is greater in length than the second side, adjacent the center hub 68 and centrally located opening 70. Two opposed sides extend between the first side and second side and are angled inward. The outer magnetic parts 78 have a corresponding shape as the stator openings 75 and are generally pie shaped, meaning the top side has a larger length than the bottom side. Two opposed sides extend between the top side and the bottom side and are angled inward.

The rotor 58 consists of a front hub 84 and rear hub 86 that are precision machined locking hubs constructed from aluminum or other non ferrous material capable of withstanding the structural stresses to be applied. This locking hubs 84, 86 contain a machined keyway 88 that corresponds with the keyway 56 machined of the shaft 18. Countersunk openings 90 that may be threaded or non-threaded, in the rear locking hub 86 receive retention devices 92. The front locking hub 84 contains openings 94 that can be threaded or non-threaded, for receiving retention devices 92. A tapped, threaded and countersunk opening 96 is disposed on the rear locking hub 86 for receiving an engagement device 98 which serves to lock the rear locking hub 86, and by way thereof, the rotor 58 to the shaft 18. The rotor 58 contains openings 100 that correspond and are aligned with the openings 94 of the front locking hub 84 and the openings 96 of the rear locking hub 86 and aligned therewith. The retention devices 92 are received within the openings 100 of the rotor 58 and the openings 94 of the front locking hub 84 and the openings 96 in the rear locking hub 86. The retention devices 92 may be a screw, bolt, fastener, or the like.

The circumference of the front locking hub 84 and rear locking hub 86 are less than the diameter of the centrally located opening 70 of the stator 24. The rotor 58 also consists of a preferably finely machined quality steel plate 102 with machined openings 100 for receiving the retention devices 92. The steel plate 102 of the rotor 58 also contains a keyway 104 and magnet assembly openings 106 for accepting magnet assemblies 112. The magnet assemblies comprise two outer magnets 108 and a central magnet 110. Preferably, the outer magnets 108 are of a ceramic type 108 which adds magnetic flux depth while also serving as a type of heat shield and an assembly comprised of NdFeb which supplies the majority of the magnetic flux strength being seventy percent of the combined magnet assembly mass. The central magnet 110 is preferably a NdFeb magnet and is laminated to the outer magnets 108 using a fast setting epoxy and collectively is termed a singular magnet assembly 112. The magnet assembly 112 is received within the magnet assembly openings 106 of the rotor 58. A carbon fiber exterior covering 82 is applied to the face of the steel plate 102 to add structural integrity to the lateral and horizontal forces.

Figure 12:
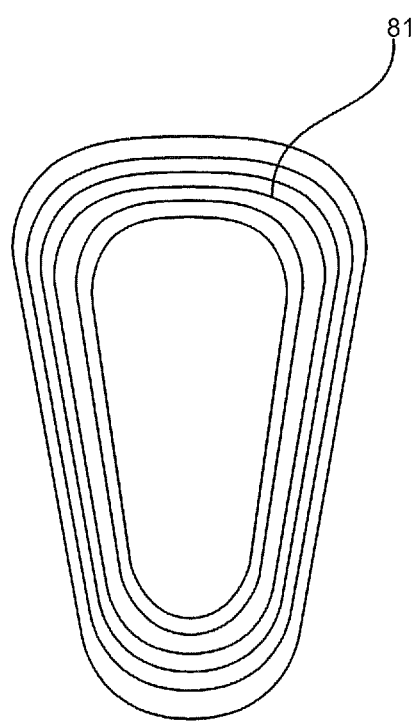
FIG. 12 is an alternative embodiment of a magnet assembly.

The rotor 58 contains at least one, and preferably a plurality of rotor openings 106 for receiving the magnet assembly 112 consisting of two outer magnets 108 and an inner magnet 110. Preferably the central magnet 110 has a larger width than the outer magnets 108. The rotor openings 106 are generally pie shaped, meaning the first side adjacent the exterior of the rotor 58 is greater in length than the second side, adjacent the central opening. Two opposed sides extend between the first side and second side and are angled inward. The outer magnet 108 and central magnet 110 have a corresponding shape as the rotor openings 106 and are generally pie shaped, meaning the top side has a larger length than the bottom side. Two opposed sides extend between the top side and the bottom side and are angled inward. Alternatively, a single NdFeb magnet may be used as illustrated in FIG. 12. As illustrated in FIG. 12, the single NdFeb magnet consisting of coil wiring 81 wound around the magnet.

FIG. 9 illustrates an exemplary embodiment of a Hall Effect sensor assembly 28 of the present invention, which is the communication device to an exterior controller 116. Being one of several options of communication being an optical device or rotary encoder, the Hall Effect sensor assembly 28 operates within cost effectiveness utilizing the magnetic flux from the existing rotor assembly. This view does not assign or restrict the layout or the number of sensors or magnet assemblies for a specific desired communication device. The Hall Effect sensor assembly 28 is positioned on a mounting plate 112 that may be positioned on the compression rods 48. As illustrated in FIG. 9, the mounting plate 112 contains threaded rod openings 114 which the compression rods 48 extend therethrough. As shown, the mounting plate 112 may contain four equally spaced apart rod openings 114 around the exterior of the mounting plate 112. The mounting plate 112 as illustrated is generally circular for placement within the generally circular housing 12 that is fitted and retained in position with the threaded compression rods 48 and the appropriate retaining device, such as a nut or the like, that will secure the mounting plate 112, but still allow for horizontal rotation. The mounting plate 112 fits within tolerances into the housing 12 and is secured to the housing 12 with a set screw 118. A slotted opening 120 within the housing 12 allows for adjustment, such as horizontal adjustment, which will advance or retard the energizing of the coil assemblies for calibrating the device. The set screw 118 fits into a tapped and threaded opening prepared in the mounting plate 112. This ability to adjust the timing of coil energizing is critical when the device 10 is demanded to operate from differing voltage levels as a lower than optimal voltage will require a retarding adjustment and higher voltages will require advancement in the timing adjustment. The Hall Effect sensors 122 of which placement in conjunction with the magnetic flux created by the rotor 58 is critical to communicate correct signals to the controller 116. FIG. 9 shows a front rotor hub 84 and shaft 18 with tolerances that will not obstruct free movement of the mounting plate 112. The Hall Effect sensors 122 are wired and adjoined to a singular connection device 62 which fits into a machined opening prepared in the rear end cap 16. The Hall Effect Sensor may also be an encoder, optical sensor, or like sensor.

Figure 10:
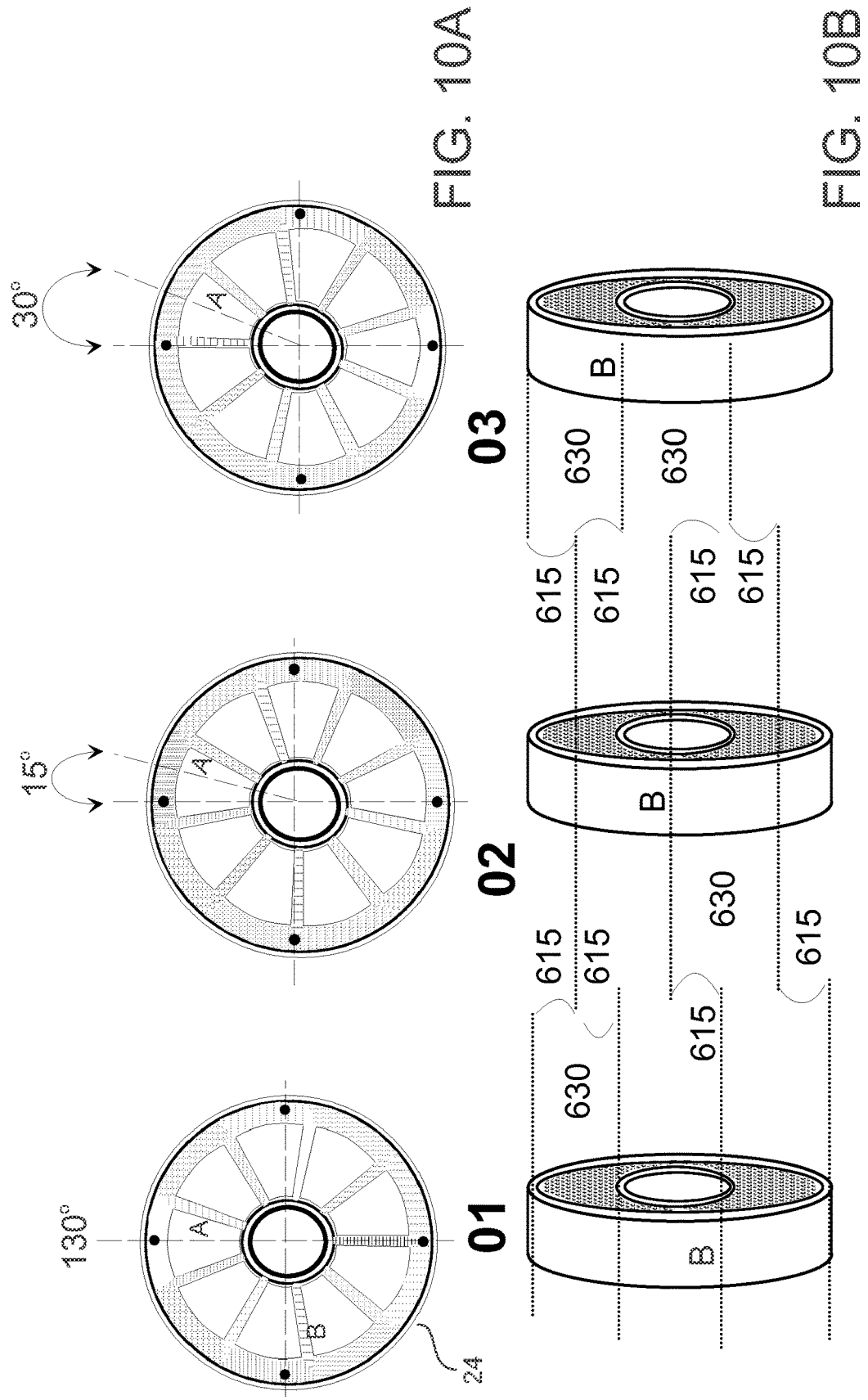
FIG. 10A is a stator face view and degrees of alignment change between stator assemblies.
FIG. 10B is a perspective view of the stators and similar degrees of alignment change between stator assemblies.

Referring next to FIG. 10, wherein depicts a view of a singular design of the stator 24 and its location or rotation in relation to the rotor 58. It is imperative when designing the layout of this type of motor/generator that the primary functions being mechanical power production, electrical power production or an equal combination of both. There are some secondary functions which can be adapted to this motor/generator such as applied braking forces. If the primary demand of the motor/generator is to produce electric power or when a mechanical power producing platform is desired without the need for braking then the typical odd number of stator coils per assembly will act sufficiently given the layout or design reflects the ability to regenerate electrical power in the industry standard of three phase. This view depicts a design that produces large amounts of braking forces and yet retains the ability to regenerate electrical power in three phases and allows for an equal number of coils per stator 24. With first view being FIG. 10A, depicting a face view and rotations of a stator 24 and second view being FIG. 10B which is a perspective view in relation to the same rotational degrees as depicted in FIG. 10A. First in FIG. 10A the first stator 24 labeled 01 in FIG. 10A depicting a "0" degree mark B-B and magnet assembly 'A' and f refers to top dead center. Referring next to stator assembly 24 "2" in FIG. 10A which depicts a rotation of an offset degree clockwise from "0" and then referring next to stator 24 "3" in FIG. 10A which also depicts a clockwise rotation of an offset degree from "0". This rotation of the stator 24 requires relocation of retention openings 76 disposed on the housing 12 and stator 24. In FIG. 10B a perspective view depicting the same rotation as in FIG. 10A beginning with stator 24 "01" and next depicting magnet assembly 107 "02" and the clockwise offset degree rotation difference 615 from '0' degrees 600 and 630 depicting magnet assembly "03" and the offset degree difference between center line in each stator assembly, including varying degrees based upon the desires of the user.

Figure 11:
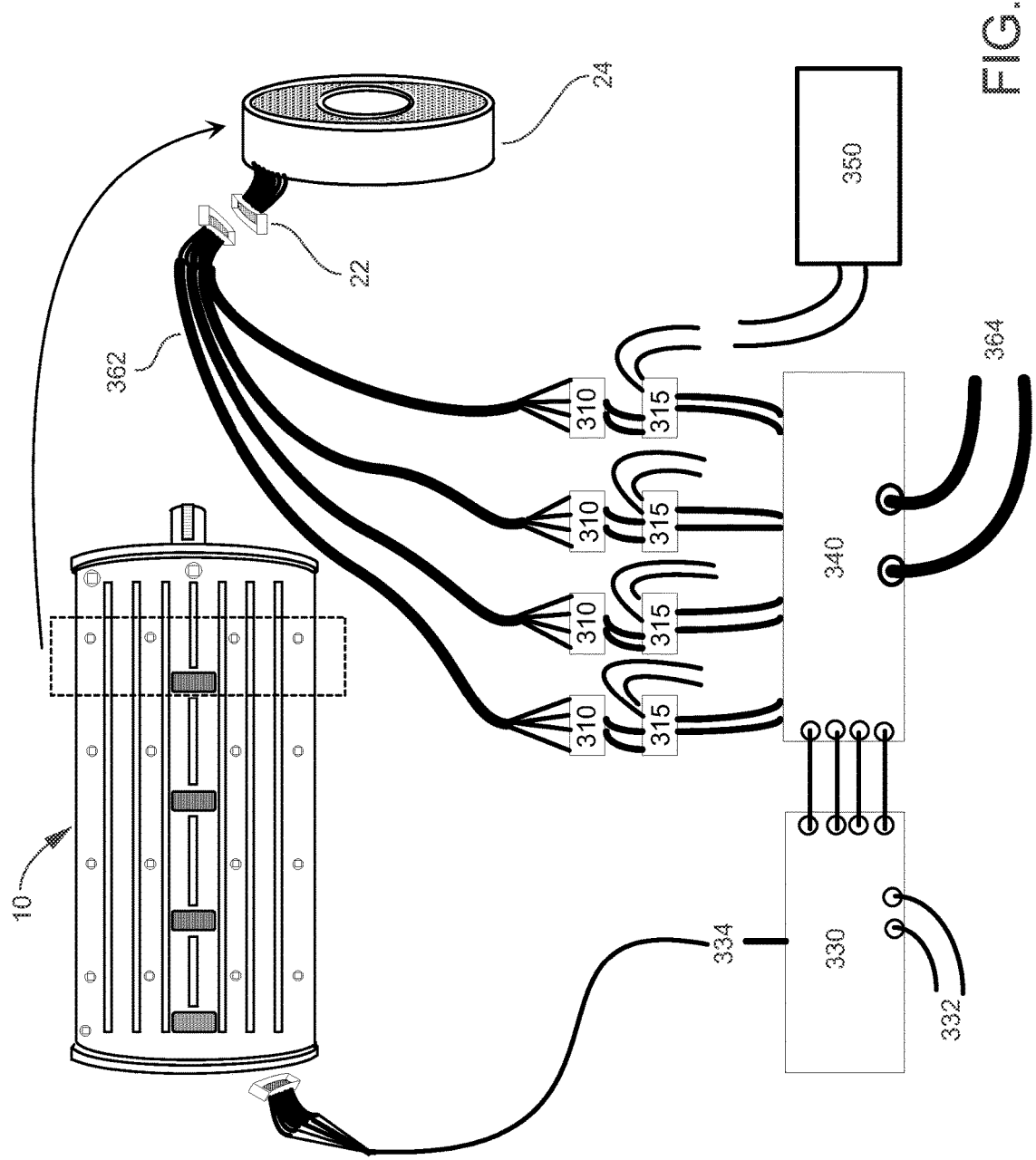
FIG. 11 is a motor control and control panel wiring.

FIG. 11 illustrates an exemplary embodiment of electronic controller 116 of the device 10. FIG. 01 which depicts a four stator/five rotor design of which the stator and rotor have equal (eight) section magnet assembly openings 106 of the rotor 58 and stator openings 75 of the stator 24 per assembly referenced in FIG. 6 and FIG. 7. FIGS. 6 and 7 refer to a singular stator 24 and electrical connections 22 and are wired to a control panel 362. A power supply input 364 is engaged to a high speed switch mechanism 340 which in turn converts the direct current power supply to synchronous alternating current. This high speed switch 340 is controlled and monitored with a PC, high speed PLC or micro processor 330, here after called the 'processor', that will accept signals from both device positioning sensors 334 and outside sensors 332. The processor 330 also controls first bidirectional switching 315 which switches between two functions. The function of this first bidirectional switch 315 is defined to allow power to be supplied to the device 10 passing through a secondary bidirectional switch 310 or to allow electrical energy produced by the device 10 to flow to a voltage regulator 350 and then to the power supply 364. The function of second bidirectional switch 310 is defined to allow power to flow to the device 10 specifically a coil assembly disposed in the stator 24 by two methods. Each coil assembly in the stator 24 is either dual or compound wound as depicted in FIG. 06, and thus has the ability to accept power either in series or parallel. Each coil assembly receiving electrical power in series combines each winding to act as a singular wound coil and thus produce mechanical power in relation to the device 10 extended run time. Each coil assembly when receiving power in parallel allows each of the two coil windings to act as individual coils thus producing considerable more mechanical power but only for predetermined run time. Coil saturation will become evident if this run time is extended beyond the saturation point of the coils and heat will then begin to deteriorate the windings. This view dose not assigns or set limitations to complexity of the motor/generator control panel design.

The device 10 as illustrated includes two stators 24 and three rotors 58. However, the device may include any number of rotors 58 and stators 24 and in any combination.

The device 10 as illustrated in FIGS. 1, 8A, and 8B may contain fins 124 or slots that serve a cooling function. The fins 124 or slots act as a heat transfer mechanism for dissipating heat from the device 10.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A device that is capable of operating as an electrical motor or a power generator, comprising:
a housing having a front end cap and a rear end cap;
a shaft rotationally engaged to the front end cap and rear end cap;
at least one in-line stator that includes:
a stator plate having an external ring disposed around a centrally located bore for receiving the shaft; and
at least one opening through one axial end to another axial end of the stator plate and within the external ring for receiving a coil assembly, each coil assembly having one or more wires wound around a center magnetic structure with the center magnetic structure being disposed between outer magnetic plates such that each outer magnetic plate is parallel to a surface of the stator plate, with one or more coil assemblies being selectively configurable during operation to collect electrical power from and provide electrical power to that coil assembly; and
at least one in-line rotor disposed adjacent the at least one in-line stator that includes:
a rotor plate with a centrally located bore for receiving the shaft; and
at least one opening within the rotor plate for receiving a magnet assembly.

2. The device according to claim 1, further comprising a Hall Effect Sensor.

3. The device according to claim 1, further comprising a plurality of openings through the stator plate and within the external ring of that plate, each opening having a first side, a second side, and two opposed sides, wherein the first side is longer than the second side and the two opposed sides connect the first side and the second side.

4. The device according to claim 1, further comprising a plurality of openings through the rotor plate, each opening having a first side, a second side, and two opposed sides, wherein the first side is longer than the second side and the two opposed sides connect the first side and the second side.

5. The device according to claim 1, further comprising a hub positioned within the centrally located bore of the at least one rotor, extending horizontally outward and rotationally engaged to the centrally located bore of the at least one stator.

6. The device according to claim 1, wherein the magnet assembly comprises a central magnet having a first side and a second side and an outer magnet engaged to the first side of the central magnet and an outer magnet engaged to the second side of the central magnet.

7. The device according to claim 1, wherein a rod extends between the front end cap and the rear end cap.

8. The device according to claim 1, wherein the at least one stator and the at least one rotor are positioned in-line along the shaft and each coil assembly of the at least one stator and each magnet assembly of the at least one rotor are positioned in dose proximity to one another.

9. The device according to claim 1, further comprising a stator electrical connector engaged to a controller.

10. The device according to claim 1, wherein the at least one rotor and the at least one stator are rotationally engaged to the rotatable shaft and during de-acceleration of the shaft, one or more magnetic forces between each coil assembly and a corresponding magnet assembly act to brake in part acceleration of the shaft.

11. The device according to claim 1, further including a first rotor, a second rotor, a third rotor, a first stator, and a second stator, wherein the first stator is positioned between the first and second rotors and the second stator is positioned between the second and third rotors.

12. The device of claim 1, wherein each coil assembly is selectively configurable to collect electrical power from and provide electrical power to that coil assembly.

13. The device of claim 1, wherein the one or more wire windings are transverse to the shaft.

14. The device of claim 1, wherein the magnet assembly is comprised of a central magnet with a first side and a second side and a first outer magnet engaged to the first side and a second outer magnet engaged to the second side, the first and second sides of the central magnet being transverse to the shaft.

15. The device according to claim 1, wherein the device further includes:
at least one switch operationally coupled to a corresponding coil assembly and selectively configurable to collect electrical power from and provide electrical power to the corresponding coil assembly.

16. The device according to claim 1, wherein the one or more wires includes first and second wires wound around the center magnetic structure with the first and second wires selectively configured to collect electrical power from and provide electrical power to the corresponding coil assembly.

17. The method of claim 1, wherein the operation of the motor and the generator corresponds to the shaft being rotated.

18. A device that is capable of operating as an electrical motor or a power generator, comprising:
a housing having a front end cap and a rear end cap;
a shaft rotationally engaged to the front end cap and rear end cap;
at least one in-line stator that includes:
a stator plate having an external ring disposed around a centrally located bore for receiving the shaft; and
a plurality of openings through one axial end to another axial end of the stator plate and within the external ring, each opening being capable of receiving a corresponding coil assembly, each coil assembly having one or more wires wound around a center magnetic structure with the center magnetic structure being disposed between outer magnetic plates such that each outer magnetic plate is parallel to a surface of the at least one stator, with one or more coil assemblies being selectively configurable to collect electrical power from and provide electrical power to that coil assembly, wherein the openings are in a spaced-apart relationship in the external ring; and
at least one in-line rotor that includes:
a rotor plate with a centrally located bore for receiving the shaft; and
a plurality of openings through the rotor plate, each opening being capable of receiving a corresponding magnet assembly, wherein the openings are in a spaced-apart relationship in the rotor plate.

19. The device according to claim 18, wherein the coil assembly is comprised of a center magnetic structure with a first side and a second side and a first outer magnetic plate engaged to the first side and a second outer magnetic plate engaged to the second side and the center magnetic structure and the first and second outer magnetic plates are composed of high permeability steel.

20. The device according to claim 18, wherein the magnet assembly is comprised of a central magnet with a first side and a second side and a first outer magnet engaged to the first side and a second outer magnet engaged to the second side, wherein the first and second outer magnets are composed of a ceramic material and the central magnet is composed of a rare earth metal.

21. The device according to claim 18, further including a mounting plate positioned along the shaft and containing a Hall Effect Sensor.

22. The device according to claim 18, wherein each magnet assembly is comprised of a central magnet with a first side and a second side and a first outer magnet engaged to the first side and a second outer magnet engaged to the second side, the first and second sides of the central magnet being transverse to the shaft.

23. A method performed by a controller for controlling a device that is capable of operating as an electrical motor or a power generator, the device having at least one in-line stator with one or more coil assemblies and at least one in-line rotor with one or more magnet assemblies, the controller being operationally coupled to each coil assembly via a corresponding switch, with each switch capable of being configured to either provide electrical power to or receive electrical power from a corresponding coil assembly, the method comprising:
configuring a first switch corresponding to a first coil assembly of the at least one in-line stator so that the first coil assembly is operable to receive first electrical power via the first switch so that the first coil assembly is operable with at least one magnet assembly of the at least one in-line rotor to provide rotational power to a shaft; and
wherein the device further includes:
a housing having a front end cap and a rear end cap;
the shaft rotationally engaged to the front end cap and the rear end cap;
the at least one in-line stator configured to include:
a stator plate having an external ring disposed around a centrally located bore for receiving the shaft; and
at least one opening through one axial end to another axial end of the stator plate and within the external ring for receiving a coil assembly, each coil assembly having one or more wires wound around a center magnetic structure with the center magnetic structure being disposed between outer magnetic plates such that each outer magnetic plate is parallel to a surface of the stator plate, with one or more coil assemblies being selectively configurable during operation to collect electrical power from and provide electrical power to that coil assembly; and the at least one in-line rotor configured to include:
- a rotor plate with a centrally located bore for receiving the shaft; and
- at least one opening within the rotor plate for receiving a magnet assembly.

24. The method according to claim 23, wherein the device further includes at least two rotors rotationally engaged to the shaft and at least one stator engaged to the housing and in communication with the controller through a stator electrical connector.

25. The method according to claim 23, further comprising:
- configuring a second switch corresponding to a second coil assembly of the at least one stator so that the second coil assembly is operable to provide second electrical power from the second coil assembly, with the second coil assembly being operable with the at least one magnet assembly of the at least one rotor while the shaft is being rotated so as to generate the second electrical power.

* * * * *